(12) United States Patent
Ota et al.

(10) Patent No.: US 9,778,630 B2
(45) Date of Patent: Oct. 3, 2017

(54) CONTROL DEVICE AND SYSTEM PROGRAM FOR MAINTAINING GLOBAL VARIABLE AND REFERENCE DATA CONSISTENCY DURING PARALLEL PROCESSING OF MULTIPLE TASKS

(71) Applicant: OMRON CORPORATION, Kyoto (JP)

(72) Inventors: Masanori Ota, Shiga (JP); Yasunori Sakaguchi, Hampshire (GB); Koji Yaoita, Kyota (JP)

(73) Assignee: OMRON CORPORATION, Kyoto-Shi, Kyoto (JP)

( * ) Notice: Subject to any disclaimer, the term of this patent is extended or adjusted under 35 U.S.C. 154(b) by 721 days.

(21) Appl. No.: 14/027,578

(22) Filed: Sep. 16, 2013

(65) Prior Publication Data

US 2014/0018939 A1  Jan. 16, 2014

Related U.S. Application Data

(63) Continuation of application No. PCT/JP2012/055675, filed on Mar. 6, 2012.

(30) Foreign Application Priority Data

Mar. 15, 2011  (JP) ................................ 2011-056872

(51) Int. Cl.
*G06F 9/46* (2006.01)
*G06F 9/455* (2006.01)
(Continued)

(52) U.S. Cl.
CPC ......... *G05B 15/02* (2013.01); *G05B 19/0426* (2013.01); *G05B 19/056* (2013.01);
(Continued)

(58) Field of Classification Search
None
See application file for complete search history.

(56) References Cited

U.S. PATENT DOCUMENTS 5,974,346 A    10/1999  Poledna
8,893,128 B2 * 11/2014  Levin .................... G06F 9/5016
                                                    370/229
(Continued)

FOREIGN PATENT DOCUMENTS

JP    10-511484      11/1998
JP    2003-114908     4/2003
(Continued)

OTHER PUBLICATIONS

International Search report for PCT/JP2012/055675, mail date is Jun. 12, 2012.
(Continued)

*Primary Examiner* — Bradley Teets
(74) *Attorney, Agent, or Firm* — Greenblum & Bernstein, P.L.C.

(57) ABSTRACT

A control device includes a task execution unit; a storage unit which stores a variable in a program, which is capable of being referenced and updated; and a collection unit which collects a variable when a task is executed. The storage unit stores reference data corresponding to the variable. A plurality of tasks include: an update task which is capable of updating and referencing the variable; and a reference task which is capable of referencing the reference data. The collection unit collects the reference data when the plurality of tasks are executed.

6 Claims, 7 Drawing Sheets

(51) Int. Cl.
- *G05B 15/02* (2006.01)
- *G05B 19/05* (2006.01)
- *G06F 9/52* (2006.01)
- *G05B 19/042* (2006.01)
- *G06F 11/32* (2006.01)

(52) U.S. Cl.
CPC .............. *G06F 9/52* (2013.01); *G06F 11/323* (2013.01); *G06F 2201/865* (2013.01)

(56) References Cited

U.S. PATENT DOCUMENTS

| | | | |
|---|---|---|---|
| 2007/0067373 A1* | 3/2007 | Higgins | G06F 11/3013 |
| 2007/0198781 A1* | 8/2007 | Dice | G06F 9/466 |
| | | | 711/145 |
| 2008/0010563 A1* | 1/2008 | Nishimura | G06F 9/4812 |
| | | | 714/55 |
| 2008/0056239 A1* | 3/2008 | Loingtier | H04L 29/06027 |
| | | | 370/352 |
| 2012/0240132 A1 | 9/2012 | Kobayashi et al. | |

FOREIGN PATENT DOCUMENTS

| | | | |
|---|---|---|---|
| JP | 2005275846 A | * | 10/2005 |
| JP | 2007-219920 | | 8/2007 |
| JP | 2009043244 A | * | 2/2009 |
| JP | 2009-181443 | | 8/2009 |
| JP | 2010-113529 | | 5/2010 |
| JP | 2010-181923 | | 8/2010 |

OTHER PUBLICATIONS

U.S. Appl. No. 14/005,345 to Osamu Hamasaki et al., filed Sep. 16, 2013.
U.S. Appl. No. 14/003,342 to Koji Yaoita et al., filed Sep. 5, 2013.
Extended European Search Report dated Jul. 24, 2015 for European Patent Application No. 12757853.2.

* cited by examiner

| Name | Degree of preference | Cycle | Program |
|---|---|---|---|
| Task A | 1 | 1ms | P1, P2 |
| Task B | 2 | 2ms | P3, P4 |
| Task C | 3 | 4ms | P5 |

CONTROL DEVICE AND SYSTEM PROGRAM FOR MAINTAINING GLOBAL VARIABLE AND REFERENCE DATA CONSISTENCY DURING PARALLEL PROCESSING OF MULTIPLE TASKS

RELATED APPLICATIONS

This application is a Continuation application of International Application No. PCT/JP2012/055675, filed Mar. 6, 2012, and claims the benefit of Japanese application No. 2011-056872, filed Mar. 15, 2011, the disclosures of which are incorporated by reference herein in their entireties.

TECHNICAL FIELD

The present invention relates to a control device for controlling a control object apparatus and a system program to be executed by such a control device.

BACKGROUND ART

Conventionally, a PLC (Programmable Logic Controller) for controlling an industrial machine or the like installed in a production line of a factory has been known.

The PLC is provided with a CPU unit for controlling the PLC, an input unit to which a signal from a sensor is inputted, and an output unit for outputting a control signal to an industrial machine or the like. The CPU unit has a memory for storing a user program for controlling the industrial machine or the like. This user program is configured so as to be editable by a tool device connected to the CPU unit.

Moreover, in the PLC, a process for acquiring a signal inputted to the input unit in the memory of the CPU unit, a process for executing the user program, a process for writing execution results (operation results) of the user program in the memory and for sending them to the output unit, and a peripheral process for transmitting and receiving data to and from the tool device are executed repeatedly. Thus, the PLC can control an industrial machine or the like based upon an input from the sensor.

Moreover, conventionally, a PAC (Programmable Automation Controller) provided with high degree software functions of a personal computer and reliability of PLC has been known (for example, see Patent Document 1).

The PAC of the above-mentioned Patent Document 1 is configured such that a plurality of tasks are executed in parallel with one another in a time sharing manner, with each task of the plurality of tasks being executed based in cycles based on each task. That is, in the PAC, multitask processes are carried out. In this case, each task includes an execution of a user program in accordance with the corresponding task, and the like.

Patent Document 1: Japanese Unexamined Patent Publication No. 2009-181443

SUMMARY OF THE INVENTION

Problems to be Solved by the Invention

In the conventional PAC disclosed in Patent Document 1, however, in the case of allowing a plurality of tasks to access a global variable (wide range variable) that is defined over the entire program, a problem arises in that a predetermined task fails to carry out a consistent operation by the use of the global variable when the value of the global variable is updated by executing a task other than the predetermined task during a period from the start of an execution of a predetermined task to the completion thereof.

The present invention has been devised to solve the above-mentioned problem, and an object of the present invention is to provide a control device that can carry out a consistent operation even in the case that a plurality of tasks access a global variable, and a system program to be executed in such a control device.

Means for Solving the Problem

The control device of the present invention is a control device for controlling a control object apparatus including a task execution unit configured to execute a task including a program; a storage unit configured to store a global variable capable of being referenced and updated in the program and reference data corresponding to the global variable; a collection unit configured to collect the global variable when the task including the program is executed by the task execution unit; and a reference data management unit configured to manage the reference data stored in the storage unit. The task execution unit is configured so as to execute a plurality of the tasks in parallel with one another, with each task of the plurality of tasks being executed in cycles based on each task. The plurality of tasks include an update task capable of updating and referencing the global variable and a reference task capable of referencing the reference data. The reference data management unit is configured so as to alter the value of reference data to the value of the global variable prior to executing the reference task. The collection unit is configured to collect the reference data when the plurality of tasks are executed by the task execution unit.

Additionally, to execute a plurality of tasks in parallel with one another includes a process for simultaneously executing the plurality of tasks in parallel with one another and a process for executing the plurality of tasks in parallel with one another in a time sharing manner. Moreover, the reference data corresponding to the global variable refers to a buffer for referencing the global variable.

With this configuration, only the update task is allowed to update and reference the variable and the reference task is allowed to reference the reference data corresponding to the variable. Therefore, even in the case that the value of the global variable is updated by an update task during an execution of a reference task (during a period from the start of a program for the reference task to the completion thereof), since the reference task references the reference data, it becomes possible to carry out a consistent operation in the reference task. That is, since the reference data referenced by the reference task is not updated by the update task during the reference task, it is possible to carry out a consistent operation in the reference task. Moreover, in the update task, since only the update task is allowed to update and reference the variable, it is possible to carry out a consistent operation in the update task. Therefore, even in the case that a plurality of tasks access the variable, it is possible to carry out a consistent operation by allowing the reference task to reference the reference data. Moreover, by allowing the collection unit to collect reference data during an execution of a task, it is possible to carry out a data tracing process on the reference data referenced by the reference task. Thus, for a consistent operation in the case that a plurality of tasks access to the variable, it is possible to appropriately carry out a data tracing process on the reference data corresponding to the referent of the reference task in the case of allowing the reference task to reference the reference data.

In the control device, the collection unit may be configured to collect a variable updated and referenced by the update task when the plurality of tasks are executed by the task execution unit.

With this configuration, by allowing the collection unit to collect the variable during the execution of a task, it is possible to carry out a data tracing process on the variable to be updated and referenced by the update task.

In the control device, the plurality of tasks may include one update task and a plurality of reference tasks, the storage unit stores reference data corresponding to the global variable for each of the plurality of reference tasks, and the collection unit is configured to collect the plurality of reference data when the plurality of tasks are executed by the task execution unit.

With this configuration, it is possible to carry out a consistent operation on each of the reference tasks even in the case that there are a plurality of reference tasks. Moreover, it is possible to appropriately carry out a data tracing process on the reference data corresponding to the referent of each reference task even in the case that there are a plurality of reference tasks.

The control device includes a reference data management unit configured to manage reference data to be stored in the storage unit. The reference data management unit may be configured so as to alter the value of the reference data to the value of the variable, prior to the execution of the reference task.

With this configuration, it is possible to carry out a consistent operation on the update task while making the reference data associated with the variable.

The control device includes a setting unit configured to set a collection target of the collection unit. The collection unit may be configured so as to collect the value of the collection target set by the setting unit when the plurality of tasks are executed by the task execution unit.

With this configuration, it is possible to easily set a target for data tracing by the setting unit.

The control device includes a communication unit configured to receive, from a tool device, the collection target of the collection unit and a collection cycle in which the value of the collection target is collected. The collection unit may be configured so as to collect the value of the collection target received through the communication unit in the collection cycle received through the communication unit when the plurality of tasks are executed by the task execution unit.

With this configuration, it is possible to allow the user to set a collection target and a collection cycle by using the tool device.

In this case, the communication unit may have a function for transmitting collection results collected by the collection unit to the tool device.

With this configuration, since the tool device can obtain the collection results, the user is allowed to easily confirm the collection results by using the tool device.

In the control device, the storage unit may store the collection results collected by the collection unit.

With this configuration, it is possible to accumulate the collection results in the storage unit.

The system program of the present invention is a system program for allowing a control device for controlling a control object apparatus so as to function as: a task execution unit configured to execute a task including a program; a storage unit configured to store a global variable capable of being referenced and updated in the program and reference data corresponding to the global variable; a collection unit configured to collect the global variable when the task including the program is executed by the task execution unit; and a reference data management unit configured to manage the reference data stored in the storage unit. The task execution unit is configured so as to execute a plurality of tasks including an update task capable of updating and referencing the global variable and a reference task capable of referencing the reference data in parallel with one another, with each task of the plurality of tasks being executed in cycles based on each task. The reference data management unit is configured so as to alter the value of reference data to the value of the global variable, prior to executing the reference task. The collection unit is configured so as to collect the reference data when the plurality of tasks are executed by the task execution unit.

With this configuration, by allowing the reference task to reference the reference data, it is possible to appropriately carry out a data tracing process on the reference data corresponding to the referent of the reference task, while a consistent operation is being executed.

Effect of the Invention

In accordance with the control device of the present invention and the system program executed by the control device, it becomes possible to carry out a consistent operation even in the case that a plurality of tasks access a variable.

MODE FOR CARRYING OUT THE INVENTION

Figure 1:
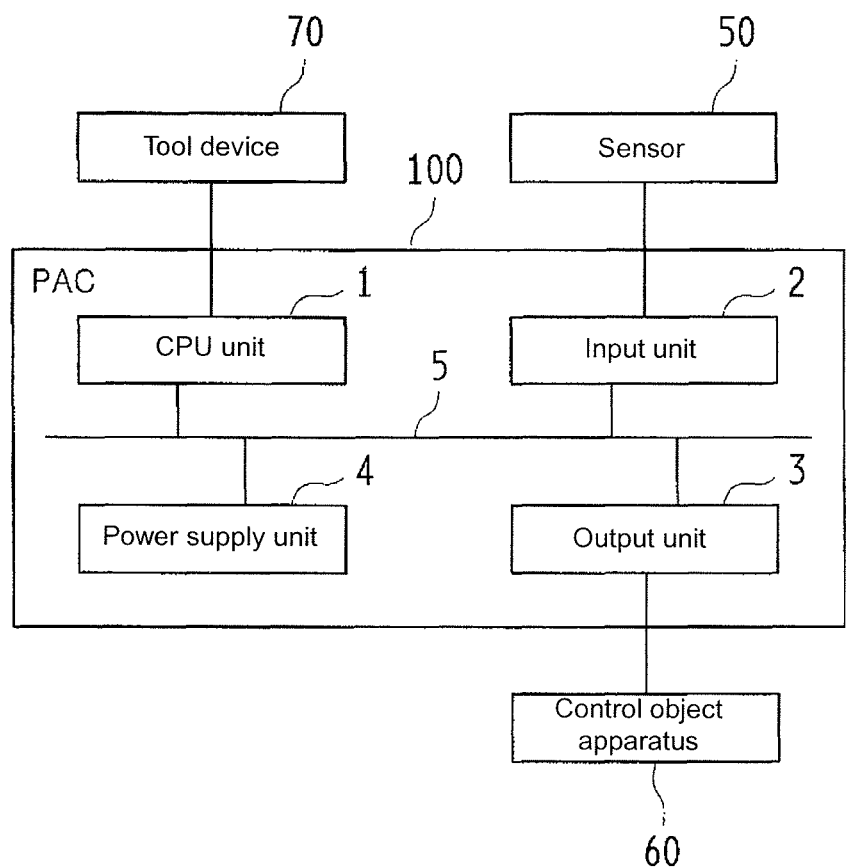
FIG. 1 is a hardware block diagram showing a configuration of a PAC provided with a CPU unit in accordance with an embodiment of the present invention.

Referring to the drawings, the following description will be given of an embodiment of the present invention.

First, referring to FIGS. 1 to 8, the following description will be given of a configuration of a PAC 100 provided with a CPU unit 1 in accordance with an embodiment of the present invention.

As shown in FIG. 1, the PAC 100 is provided with a CPU unit 1 for controlling the PAC 100, an input unit 2 to which a signal from a sensor 50 is inputted, an output unit 3 for outputting a control signal to a control object apparatus 60 such as an industrial machine, a power supply unit 4 for supplying a power to the respective units, and an internal bus 5 for connecting the respective units one another. Additionally, the CPU unit 1 is one example of "the control device" of the present invention.

The PAC 100 is configured to control the control object apparatus 60 based upon an input from the sensor 50 by executing a task. In this case, the task includes the execution of a user program for controlling the control object apparatus 60.

The CPU unit 1 in which a system program 121 (see FIG. 2) is installed is configured such that operations of the CPU unit 1 are controlled by executing the system program 121.

In this case, the system program 121 includes a program for executing an acquiring process of a signal inputted to the input unit 2 in the CPU unit 1, a program for executing a sending process of operation results by the CPU unit 1 to the output unit 3, etc. Moreover, the system program 121 includes a global variable (wide area variable) that is defined in the entire program. The global variable is a variable capable of being accessed from a plurality of tasks (programs).

Figures 2, 3:
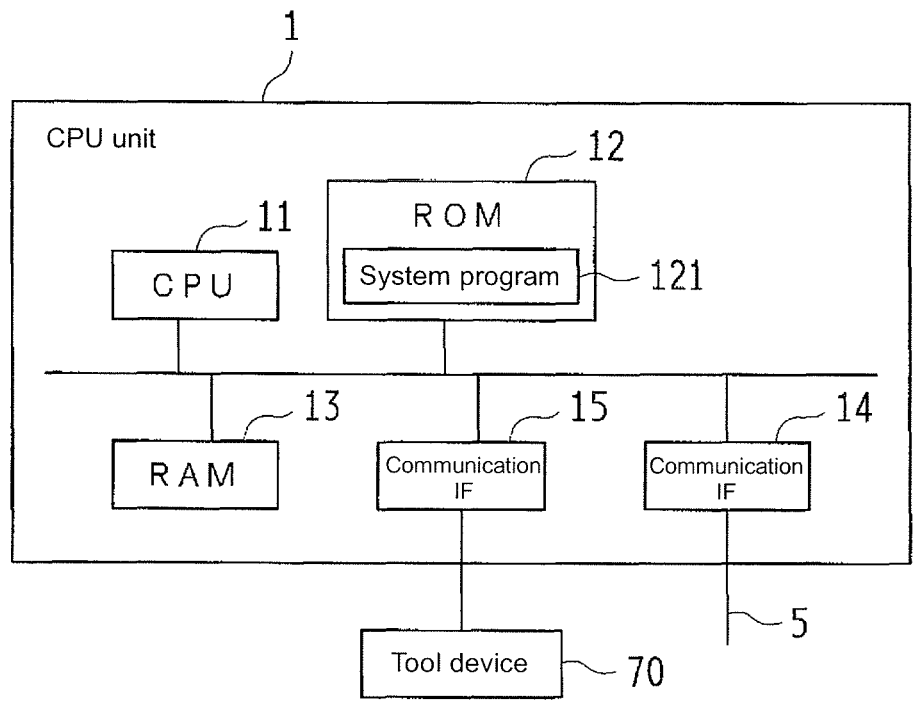
FIG. 2 is a hardware block diagram showing configurations of the CPU unit of the PAC shown in FIG. 1.
FIG. 3 is a view for explaining information relating to tasks stored in a ROM of the CPU unit shown in FIG. 2.

As shown in FIG. 2, the CPU unit 1 includes a CPU 11, a ROM 12, a RAM 13, and communication interfaces (hereinafter, referred to as "communication IF") 14 and 15. Additionally, the RAM 13 is one example of "the storage unit" of the present invention, and the communication IF 15 is one example of "the communication unit" of the present invention.

The CPU 11 has a function for executing the system program 121. The CPU 11 is configured so as to execute a plurality of tasks in parallel with one another in a time sharing manner. That is, the CPU 11 executes multitask operations.

The ROM 12 is a nonvolatile memory such as a flash memory. In the ROM 12, the system program 121 is stored, and information L1 (see FIG. 3) relating to tasks to be executed in the CPU unit 1 is also stored. The information L1 relating to tasks includes names of the respective tasks, degrees of preference of the respective tasks, cycles in which the respective tasks are executed, and programs to be executed in the respective tasks. In this case, with respect to the tasks, a task having a smaller value in the degree of preference is executed more preferentially. Moreover, in the CPU unit 1, a control cycle having a predetermined set time interval (for example, 1 ms) is adopted as a common cycle over the entire processes. Moreover, for example, the program is a user program and is described in a ladder language.

In the example of FIG. 3, a task A is more preferentially executed than tasks B and C, and executes programs P1 and P2 in a cycle of 1 ms. That is, the task A uses a control cycle of one time (time interval of 1 ms) as its execution cycle. Moreover, the task B is more preferentially executed than the task C, and executes programs P3 and P4 in a cycle of 2 ms. That is, the task B uses a control cycle of two times (time interval of 2 ms) as its execution cycle. Moreover, the cycle of the task B is set to an integral multiple (2 times) of the cycle of the task A. Furthermore, the task C is executed more subordinately than the tasks A and B, and executes a program P5 in a cycle of 4 ms. That is, the task C uses a control cycle of four times (time interval of 4 ms) as its execution cycle. Moreover, the cycle of the task C is set to an integral multiple (4 times) of the cycle of the task A.

Moreover, in the ROM 12, setting information L2 (see FIG. 4) relating to the global variable defined in the system program 121 is stored. The setting information L2 includes the name of the global variable, name of an update task and names of reference tasks. In this case, the update task refers to a task capable of updating and referencing the global variable, and the reference task refers to a task that is capable of referencing the global variable, but incapable of updating the global variable. Only one update task can be set relative to a single global variable, and one or more reference tasks can be set relative to a single global variable. Additionally, in an actual process, the reference task references reference data corresponding to the global variable, as will be described later.

Figure 4:
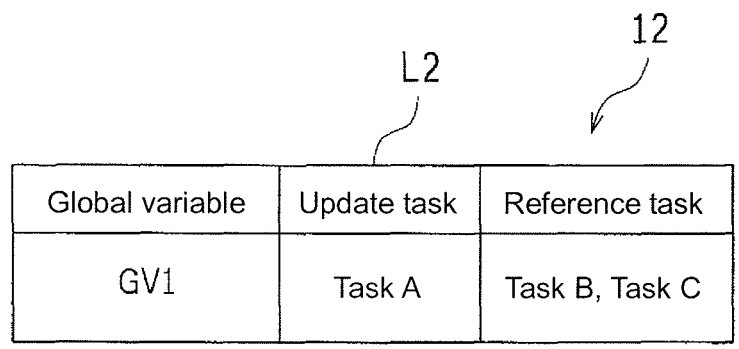
FIG. 4 is a view for explaining information relating to a global variable stored in the ROM of the CPU unit shown in FIG. 2.

In the example of FIG. 4, the task A is set as the update task of the global variable GV1, and the tasks B and C are set as reference tasks of the global variable GV1. That is, the task A is capable of updating and referencing the global variable GV1. In contrast, the tasks B and C are only capable of referencing the global variable GV1, and are incapable of updating the global variable GV1.

The RAM 13 is a volatile memory such as a DRAM. The RAM 13 has a function for temporarily storing the system program 121 or the like to be executed by the CPU 11. More specifically, the RAM 13 has a function for storing the global variable GV1 (see FIG. 6) to be updated and referenced by the task A serving as the update task, and reference data RD1 and RD2 (see FIG. 6) that are referenced by the tasks B and C serving as the reference tasks upon executing the system program 121. In this case, the reference data RD1 and RD2 are referencing buffers for the global variable GV1, and are respectively installed in association with the tasks B and C serving as the reference tasks.

The communication IF 14 is connected to the internal bus 5, and installed so as to allow the CPU unit 1 to communicate with the respective units through the internal bus 5. The communication IF 15 is connected to a tool device 70, and the CPU unit 1 is provided so as to communicate with the tool device 70.

Figure 5:
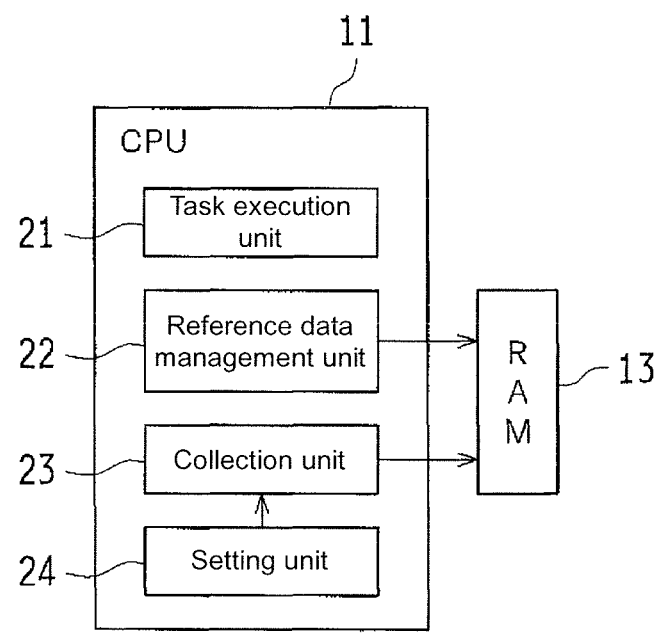
FIG. 5 is a functional block diagram of a CPU of the CPU unit shown in FIG. 2.

Moreover, as shown in FIG. 5, the CPU unit 1 includes a task execution unit 21, a reference data management unit 22, a collection unit 23, and a setting unit 24. Additionally, the task execution unit 21, the reference data management unit 22, the collection unit 23 and the setting unit 24 are realized when the CPU 11 executes the system program 121.

The task execution unit 21 is configured so as to execute a plurality of tasks in parallel with one another, with each of the plurality of tasks being executed in a cycle based on each task. More specifically, the task execution unit 21 executes the tasks A, B and C in parallel with one another in a time sharing manner. Moreover, the task execution unit 21 executes the task A in a cycle of 1 ms, executes the task B in a cycle of 2 ms, and also executes the task C in a cycle of 4 ms.

The reference data management unit 22 has a function for managing reference data stored in the RAM 13, when the system program 121 is executed. More specifically, the reference data management unit 22 is configured so as to alter the value of the reference data to the value of the global variable prior to the execution of the reference task (prior to the start of the execution of the program of the reference task). That is, the reference data management unit 22 is configured to alter the value of the reference data RD1 to the value of the global variable GV1 prior to the execution of the task B serving as the reference task, and to alter the reference data RD2 to the value of the global variable GV1 prior to the execution of the task C serving as the reference task.

The collection unit 23 has a function for collecting the value of the global variable when the task is being executed by the task execution unit 21. Moreover, the collection unit 23 has a function for collecting the value of the reference data when the task is being executed by the task execution unit 21. More specifically, the collection unit 23 has a function for collecting the values of the global variable GV1 and the reference data RD1 and RD2. Thus, the CPU unit 1 is capable of collecting a change with time of each of variables (global variable GV1 and reference data RD1 and RD2, etc.) when the system program 121 is being executed. That is, in the CPU unit 1, it is possible to carry out a data tracing process of a variable when the system program 121 is being executed.

The setting unit 24 has a function for setting a collection target by the collection unit 23. That is, the setting unit 24 has a function for setting a valuable to be data traced. More specifically, based upon data trace information T (see FIG. 7), which will be described later, the setting unit 24 is configured to set the variable to be data traced.

Figure 6:
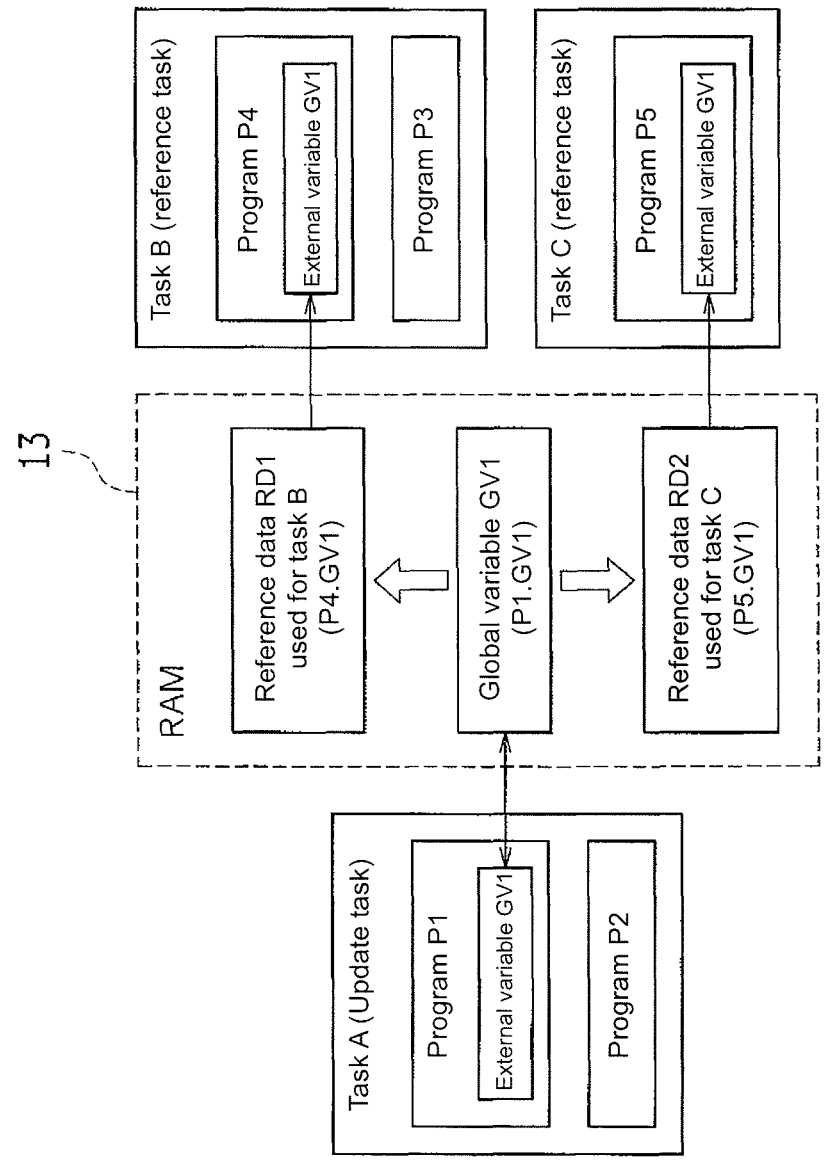
FIG. 6 is a view for explaining exclusive control among tasks relative to the global variable of the CPU unit shown in FIG. 2.

Moreover, the CPU unit 1 is configured so as to carry out an exclusive controlling process among the tasks relative to the global variable. For example, as shown in FIG. 6, the CPU unit 1 allows the task A serving as the update task and the tasks B and C serving as the reference tasks to access the global variable GV1.

More specifically, the external variable (global variable) GV1 is registered in the program P1 of the task A. Since the task A is the update task, the external variable P1.GV1 of the program P1 directly accesses the main body of the global variable GV1 of the RAM 13.

Moreover, the external variable GV1 is registered in the program P4 of the task B. Since the task B is the reference task, the external variable P4.GV1 of the program P4 accesses the reference data RD1 for the task B of the RAM 13. When the task B is executed by the task execution unit 21 (see FIG. 5), the value of the reference data RD1 for the task B is altered (updated) to the value of the global variable GV1 by the reference data management unit 22 (see FIG. 5).

Moreover, the external variable GV1 is registered in the program P5 of the task C. Since the task C is the reference task, the external variable P5.GV1 of the program P5 accesses the reference data RD2 for the task C of the RAM 13. When the task C is executed by the task execution unit 21, the value of the reference data RD2 for the task C is altered (updated) to the value of the global variable GV1 by the reference data management unit 22.

A tool device 70 is, for example, a personal computer, and has a function for producing and editing a user program to be executed by the PAC 100. Moreover, the tool device 70 has a function for downloading a user program from the PAC 100 and a function for uploading the user program to the PAC 100.

Moreover, the tool device 70 has a function for altering the setting information L2 (see FIG. 4) relative to the global variable stored in the ROM 12. Thus, the user is allowed to set an update task and a reference task relative to the global variable by using the tool device 70.

Furthermore, the tool device 70 has a function for giving an instruction for an execution of data tracing to the CPU unit 1. More specifically, the tool device 70 is configured so as to transmit data tracing information T (see FIG. 7) including the name of a variable forming a target for a data tracing and a sampling cycle (collection cycle) of the data tracing to the CPU unit 1.

Figures 7, 8:
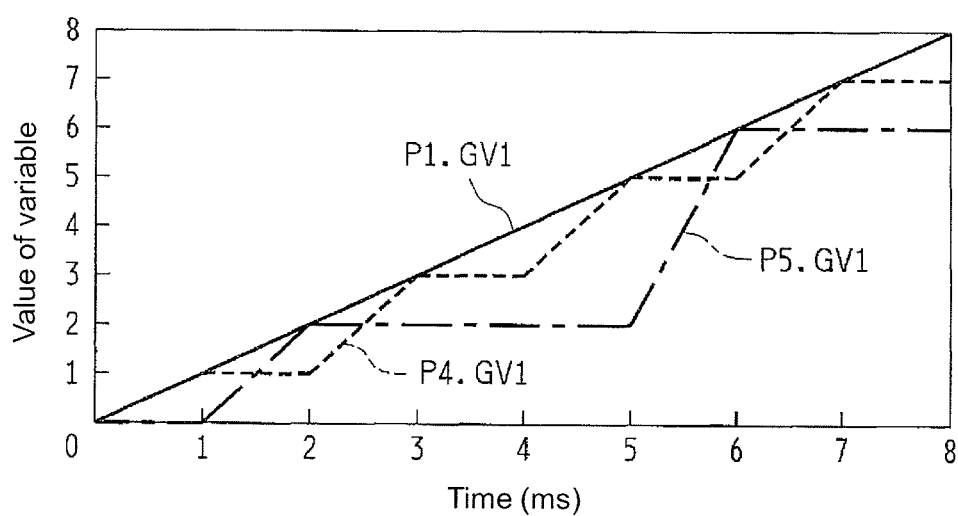
FIG. 7 is a view for explaining data trace information to be transmitted from a tool device to the CPU unit shown in FIG. 2.
FIG. 8 is a view showing a state in which trace results are indicated in a graph by the tool device shown in FIG. 2.

Moreover, as shown in FIG. 8, the tool device 70 has a function for displaying a graph showing the tracing results by the CPU unit 1 on the display unit (not shown) so as to allow the user to confirm the results of the data tracing.

Figure 9:
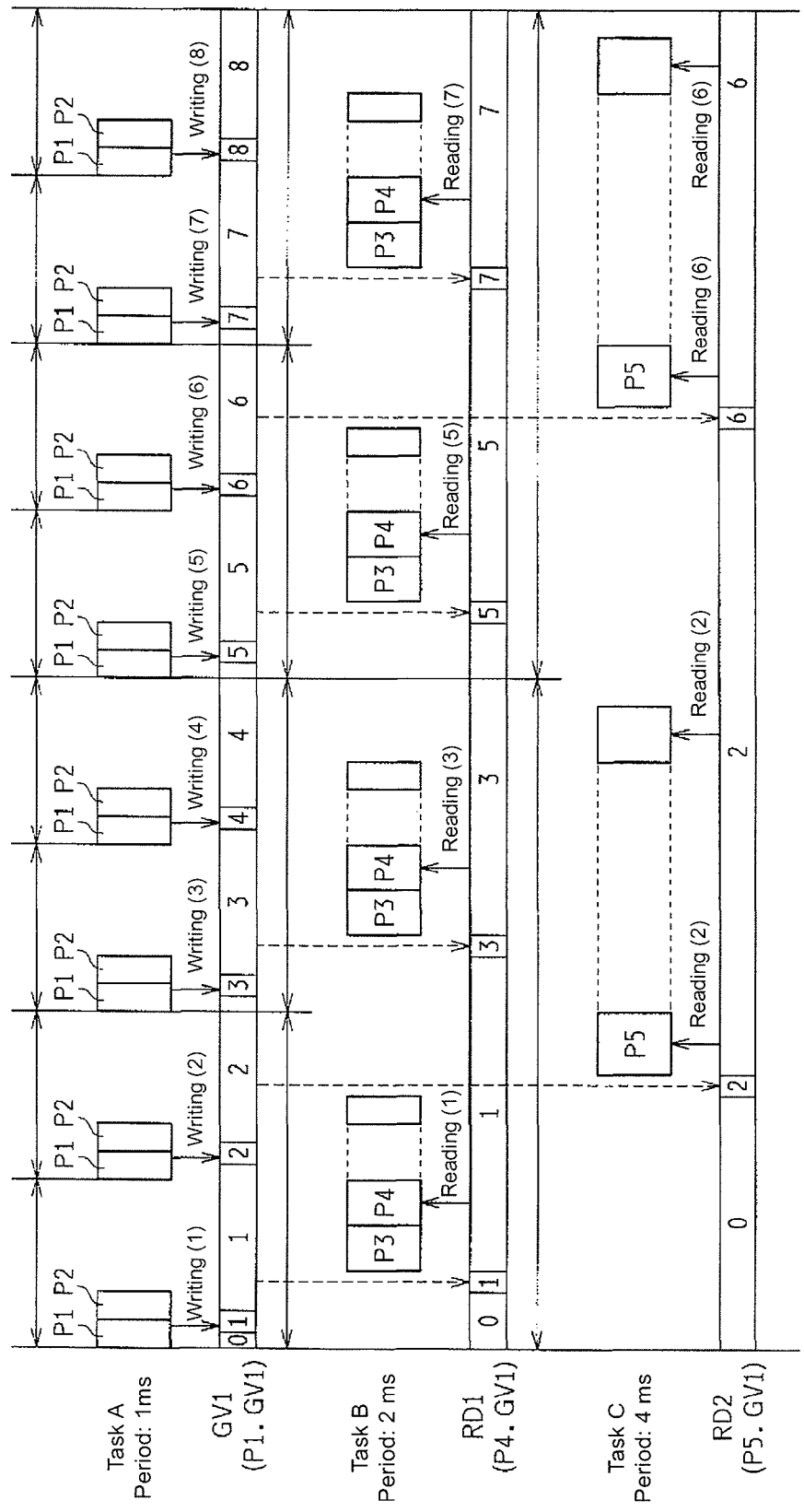
FIG. 9 shows a time chart for explaining operations at the time of a data tracing process in the CPU unit in accordance with the embodiment of the present invention.
Figure 10:
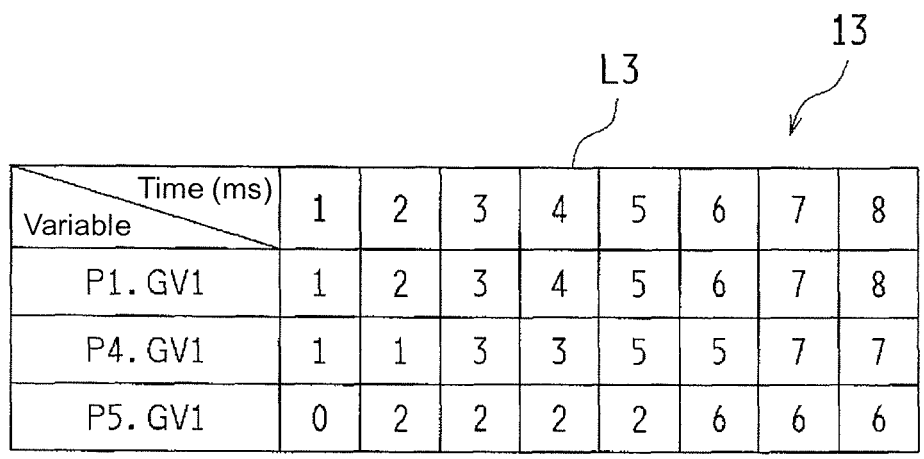
FIG. 10 is a view for explaining the trace results stored in a RAM of the CPU unit shown in FIG. 2.

Next, referring to FIGS. 9 and 10, the following description will be given of operations at the time of the data tracing process in the CPU unit 1 in accordance with the present embodiment. In this case, the following operations are carried out when the system program 121 is executed by the CPU 11 of the CPU unit 1 (see FIG. 2). That is, the system program 121 is a system program for allowing the CPU unit 1 to execute the following operations. Moreover, upon debugging a program, the data tracing process is carried out so as to confirm the operations of the program. That is, the data tracing process is carried out so as to detect a defect in the program.

The following description will be given by exemplifying a case in which prior to the start of the data tracing process, the global variable GV1 is set to "0", with the reference data RD1 and RD2 being set to "0".

First, data trace information T (see FIG. 7) is transmitted to the CPU unit 1 from the tool device 70 (see FIG. 2). Additionally, the data trace information T includes collection targets (names of variables) of the data (value) by the data tracing process, and a collection cycle (sampling cycle) in which the data of the collection target is collected. In the example of FIG. 7, the external variable P1. GV1 of the program P1, the external variable P4. GV1 of the program P4 and the external variable P5. GV1 of the program P5 are specified as the collection targets, with 1 ms being specified as the collection cycle.

In the CPU unit 1, in the case that the data trace information T is received from the tool device 70 through the communication IF 15 (see FIG. 2), the data tracing process is started. At this time, based upon the data trace information T received by the communication IF 15, the data collection target by the collection unit 23 (see FIG. 5) is set by the setting unit 24 (see FIG. 5). More specifically, the external variable P1. GV1 of the program P1, the external variable P4. GV1 of the program P4 and the external variable P5. GV1 of the program P5 are set as the collection targets.

Moreover, the execution cycles of the tasks A, B and C are started simultaneously with the control cycle by the CPU 11. Additionally, the task A is executed in a cycle of 1 ms, the task B is executed in a cycle of 2 ms, and the task C is executed in a cycle of 4 ms.

More specifically, first, the process of the task A having the highest degree of preference is started by the task execution unit 21 (see FIG. 5). At this time, since the tasks B and C are lower in the degree of preference than the task A, actual processes for the tasks B and C are not started and the tasks B and C are brought to stand-by states.

Moreover, the program P1 of the task A serving as the update task is executed, and in the program P1, "1" is written in the external variable (global variable) GV1. Thus, the value of the global variable GV1 to be stored in the RAM 13 is updated from "0" to "1". At this time, since the task A is the update task, it directly accesses the main body of the global variable GV1 of the RAM 13. Thereafter, the program P2 of the task A is executed so that the process of the task A is completed.

Prior to the execution of the task B having a higher degree of preference than the task C, the value of the reference data RD1 used for the task B is altered to the value of the global variable GV1 by the reference data management unit 22. At this time, since the value of the global variable GV1 is "1", the value of the reference data RD1 is updated from "0" to "1".

Thereafter, the programs P3 and P4 of the task B serving as the reference task are executed by the task execution unit 21. Additionally, a reading process of the external variable GV1 is carried out in the program P4. At this time, since the task B is the reference task, it accesses the reference data RD1 of the RAM 13. Thus, "1" of the reference data RD1 is read out.

Next, after a lapse of 1 ms from the simultaneous starts of the execution cycles of the tasks A, B and C, the program P4 of the task B is suspended. Then, by the collection unit 23 (see FIG. 5), the values of the external variable P1. GV1 of the program P1, the external variable P4. GV1 of the program P4 and the external variable P5. GV1 of the program P5, which are set by the setting unit 24, are collected. At this time, since the global variable GV1 is "1", the reference data RD1 is "1" and the reference data RD2 is "0", the external variable P1. GV1 becomes "1", the external variable P4. GV1 becomes "1" and the external variable P5. GV1 becomes "0". Then, since the collection results by the collection unit 23 are stored in the RAM 13 in association with the elapsed time (1 ms) from the start of the data tracing by the CPU 11, the trace results L3 (see FIG. 10) are accumulated in the RAM 13.

Moreover, since the execution cycle of the task A has been elapsed, the execution of the task A is carried out by the task execution unit 21. At this time, the tasks B and C are kept in the stand-by states. For this reason, the program P1 of the task A serving as the update task is executed so that in the program P1, "2" is written in the external variable (global variable) GV1. Thus, the value of the global variable GV1 to be stored in the RAM 13 is updated from "1" to "2". Thereafter, the program P2 of the task A is executed, and the process of the suspended task B is resumed upon completion of the process of the task A. In this case, since the task B has been suspended, the value of the reference data RD1 is not updated. Then, the rest of the program P4 of the task B is executed by the task execution unit 21 so that the process of the task B is completed.

Moreover, prior to the execution of the task C, the value of the reference data RD2 to be used in the task C is altered to the value of the global variable GV1 by the reference data management unit 22. At this time, since the value of the global variable GV1 is "2", the value of the reference data RD2 is updated from the value "0" to "2".

Thereafter, the program P5 of the task C serving as the reference task is executed by the task execution unit 21. Additionally, in the program P5, the external variable GV1 is read out. At this time, since the task C is the reference task, it accesses the reference data RD2 of the RAM 13. Thus, "2" of the reference data RD2 is read out.

Next, after a lapse of 2 ms from the simultaneous starts of the execution cycles of the tasks A, B and C, the program P5 of the task C is suspended. Moreover, the values of the external variable P1. GV1 of the program P1, the external variable P4.GV1 of the program P4 and the external variable P5.GV1 of the program P5 are collected by the collection unit 23. At this time, since the global variable GV1 is "2", the reference data RD1 is "1" and the reference data RD2 is "2", the external variable P1. GV1 is "2", the external variable P4.GV1 is "1" and the external variable P5.GV1 is "2". Moreover, since the collection results by the collection unit 23 are stored in the RAM 13 in association with the elapsed time (2 ms) from the start of the data tracing by the CPU 11, the trace results L3 are accumulated in the RAM 13.

Moreover, since the execution cycle of the task A has been elapsed, the task A is carried out by the task execution unit 21. At this time, since the execution cycle of the task B has also been elapsed, the tasks B and C are kept in the stand-by states. For this reason, the program P1 of the task A serving as the update task is executed so that in the program P1, "3" is written in the external variable (global variable) GV1. Thus, the value of the global variable GV1 to be stored in the RAM 13 is updated from "2" to "3". Thereafter, the program P2 of the task A is executed, and the process of the task A is completed.

Prior to the execution of the task B having a higher degree of preference than the task C, the value of the reference data RD1 used for the task B is altered to the value of the global variable GV1 by the reference data management unit 22. At this time, since the value of the global variable GV1 is "3", the value of the reference data RD1 is updated from "1" to "3".

Thereafter, the programs P3 and P4 of the task B serving as the reference task are executed by the task execution unit 21. Additionally, a reading process of the external variable GV1 is carried out in the program P4. At this time, since the task B is the reference task, the task B accesses the reference data RD1 of the RAM 13. Thus, "3" of the reference data RD1 is read out.

Next, after a lapse of 3 ms from the simultaneous starts of the execution cycles of the tasks A, B and C, the program P4 of the task B is suspended. Then, by the collection unit 23, the values of the external variable P1. GV1 of the program P1, the external variable P4. GV1 of the program P4 and the external variable P5. GV1 of the program P5 are collected. At this time, since the global variable GV1 is "3", the reference data RD1 is "3" and the reference data RD2 is "2", the external variable P1. GV1 becomes "3", the external variable P4. GV1 becomes "3" and the external variable P5. GV1 becomes "2". Then, since the collection results by the collection unit 23 are stored in the RAM 13 in association with the elapsed time (3 ms) from the start of the data tracing by the CPU 11, the trace results L3 are accumulated in the RAM 13.

Moreover, since the execution cycle of the task A has been elapsed, the task A is carried out by the task execution unit 21. At this time, the tasks B and C are kept in the stand-by states. For this reason, the program P1 of the task A serving as the update task is executed so that in the program P1, "4" is written in the external variable (global variable) GV1. Thus, the value of the global variable GV1 to be stored in the RAM 13 is updated from "3" to "4". Thereafter, the program P2 of the task A is executed, and the process of the suspended task B is resumed upon completion of the process of the task A. In this case, since the task B has been suspended, the value of the reference data RD1 is not updated. At this time, the task C is kept in the stand-by state. Then, the rest of the program P4 of the task B is executed by the task execution unit 21. Thereafter, the process of the suspended task C is resumed upon completion of the process of the task B. Additionally, since the task C has been suspended, the value of the reference data RD2 is not updated.

Moreover, the rest of the program P5 of the task C serving as the reference task is executed by the task execution unit 21. Additionally, the external variable GV1 is read out in the program P5. At this time, since the task C is the reference task, it accesses the reference data RD2 of the RAM 13. Thus, "2" of the reference data RD2 is read out.

After a lapse of 4 ms from the simultaneous starts of the execution cycles of the tasks A, B and C since the completion of the process of the task C, the values of the external variable P1. GV1 of the program P1, the external variable P4. GV1 of the program P4 and the external variable P5. GV1 of the program P5 are collected by the collection unit 23. At this time, since the global variable GV1 is "4", the reference data RD1 is "3" and the reference data RD2 is "2", the external variable P1. GV1 becomes "4", the external variable P4. GV1 becomes "3" and the external variable P5. GV1 becomes "2". Then, since the collection results by the collection unit 23 are stored in the RAM 13 in association with the elapsed time (4 ms) from the start of the data tracing by the CPU 11, the trace results L3 are accumulated in the RAM 13.

Moreover, since the execution cycle of the task A has been elapsed, the task A is carried out by the task execution unit 21. At this time, since the execution cycles of the tasks B and C have also been elapsed, the tasks B and C are kept in the stand-by states.

Then, the same operations as the operations described above are carried out repeatedly.

Thereafter, when the data tracing process by the CPU unit 1 is finished, the trace results L3 are transmitted to the tool device 70 from the communication IF 15 by the CPU 11. Thus, the tool device 70 is allowed to display a graph as shown in FIG. 8 on the display unit (not shown) based upon the received trace results L3. In the graph shown in FIG. 8, with respect to each of the external variable P1. GV1 of the program P1, the external variable P4. GV1 of the program P4 and the external variable P5. GV1 of the program P5 that are the targets for the data tracing process, the relationship between the elapsed time after the start of the data tracing process and the value of each of the external variables is indicated by a line graph.

In the present embodiment, as described above, by allowing only the task A serving as the update task to update and reference the global variable GV1 as well as by allowing the task B serving as the reference task to reference the reference data RD1 corresponding to the global variable GV1, it is possible to carry out a consistent operation on the task B since the task B is allowed to reference the reference data RD1, even in the case that the value of the global variable GV1 is updated by the task A during a period from the start of the program P3 of the task B to the completion of the program P4. In other words, since the updating is carried out so as to correspond to the global variable GV1 prior to the start of the program P3 of the task B, and since, by allowing the task B to reference the reference data RD1 that is constant during the period from the start of the program P3 to the completion of the program P4, no updating unexpected by the task B is carried out on the reference data RD1 during the period from the start of the program P3 to the completion of the program P4, it is possible to carry out a consistent operation on the task B.

In the same manner, by allowing only the task A serving as the update task to update and reference the global variable GV1 as well as by allowing the task C serving as the reference task to reference the reference data RD2 corresponding to the global variable GV1, it is possible to carry out a consistent operation on the task C since the task C is allowed to reference the reference data RD2, even in the case that the value of the global variable GV1 is updated by the task A during a period from the start of the program P5 of the task C to the completion thereof. In other words, since the updating is carried out so as to correspond to the global variable GV1 prior to the start of the program P5 of the task C, and since, by allowing the task C to reference the reference data RD2 that is constant during the period from the start of the program P5 to the completion of thereof, no updating unexpected by the task C is carried out on the reference data RD2 during the period from the start of the program P5 to the completion thereof, it is possible to carry out a consistent operation on the task C.

Moreover, in the task A serving as the update task, since only the task A is allowed to update and reference the global variable GV1, it is possible to carry out a consistent operation on the task A. Therefore, even in the case that a plurality of tasks A, B and C access the global variable GV1, by allowing the tasks B and C serving as the reference tasks to respectively reference the reference data RD1 and RD2, it is possible to carry out a consistent operation. As a result, it is possible to appropriately carry out exclusive controls among the tasks A, B and C relative to the global variable GV1.

Moreover, in the present embodiment, by collecting the value of the global variable GV1 by the collection unit 23 when the tasks A, B and C are being executed, a data tracing process can be carried out on the global variable GV1 (external variable P1. GV1) to be updated and referenced by the task A serving as the update task. Furthermore, by collecting the values of the reference data RD1 and RD2 by the collection unit 23 when the tasks A, B and C are being executed, a data tracing process can be carried out on the global variables GV1 (external variables P4. GV1 and P5. GV1) to be referenced by the tasks B and C serving as the reference tasks. With this configuration, even in the case that the tasks B and C serving as the reference tasks are allowed to respectively reference the reference data RD1 and RD2 so as to carry out a consistent operation in the case of allowing the tasks A, B and C to access the global variable GV1, it is possible to accurately carry out a data tracing process on each of the reference data RD1 and RD2 that are the referencing ends of the tasks B and C.

Moreover, in the present embodiment, when the task B serving as the reference task is executed, the value of the reference data RD1 is altered to the value of the global variable GV1, while the task C serving as the reference task is executed, the value of the reference data RD2 is altered to the value of the global variable GV1. Therefore, it is possible to carry out a consistent operation on each of the tasks B and C serving as the update tasks while the reference data RD1 and RD2 are made associated with the global variable GV1.

Moreover, in the present embodiment, by setting the collection target and the collection cycle of the data tracing process based upon the received data trace information T from the tool device 70 by the communication IF 15, the user is allowed to set the collection target and the collection cycle by using the tool device 70.

Furthermore, in the present embodiment, by transmitting the trace results L3 from the communication IF 15 to the tool device 70, since the tool device 70 can obtain the trace results L3, the user is allowed to confirm the trace results L3 by using the tool device 70.

Moreover, in the present embodiment, since the CPU 11 executes a plurality of tasks in parallel with one another in a time sharing manner, it is possible to effectively utilize the processing capability of the CPU 11.

Additionally, the present embodiments disclosed above are exemplary only in all the aspects, and do not form the basis of a limited interpretation. Therefore, the technical scope of the present invention is not interpreted only by the above-mentioned embodiments, but defined based upon the description of the claims. Moreover, the technical scope of the present invention includes all modifications made within the meaning and scope equal to the claims.

For example, the present embodiment has exemplified a configuration in which the PAC 100 is provided with the CPU unit 1, the input unit 2, the output unit 3 and the power supply unit 4; however, not limited to this configuration, the PAC may have another unit, such as a communication unit, and no input unit may be installed in the PAC.

Moreover, the present embodiment has exemplified a configuration in which the PAC 100 is constituted by a plurality of units; however, not limited by this configuration, the PAC may be formed by one casing, with functions of the respective units being incorporated in the casing.

Moreover, in the present embodiment, the external variable (global variable) GV1 may be registered in the program P2 of the task A. In this case, in the external variable P2. GV1 of the program P2, since the task A is the update task, the task A directly accesses the main body of the global variable GV1 of the RAM 13.

Furthermore, in the present embodiment, the external variable GV1 may be registered in the program P3 of the task B. In this case, since the task B is the reference task, the external variable P3. GV1 of the program P3 accesses the reference data RD1 for the task B of the RAM 13.

Furthermore, the present embodiment has exemplified a configuration in which the CPU 11 executes a plurality of tasks in parallel with one another in a time sharing manner; however, not limited by this configuration, the CPU may be a multi-core device that carries out a plurality of tasks simultaneously in parallel with one another. By using this configuration, it becomes possible to improve the processing capability of tasks.

Moreover, the present embodiment has exemplified a configuration in which, the task execution unit 21, the reference data management unit 22, the collection unit 23 and the setting unit 24 are realized when the CPU 11 executes the system program 121; however, not limited to this configuration, the task execution unit 21, the reference data management unit 22, the collection unit 23 and the setting unit 24 may be respectively configured by hardware units.

Moreover, the present embodiment has exemplified a configuration in which a sampling cycle contained in the data trace information T is set as a time interval; however, not limited to this configuration, the sampling cycle may be set by the cycle of the specified task.

In the present embodiment, for simplicity of explanation, the trace results L3 from 1 ms to 8 ms are shown; however, actually, the data tracing process is executed for a longer period of time. For example, the data tracing process is executed for 10 seconds (10000 ms).

Moreover, the present embodiment has exemplified a case in which the collection results and the elapsed periods of time are included in the trace results L3; however, not limited to this, time information relating to collected data, index information indicating the sequence of the collected data, or the like may be included therein.

Furthermore, the present embodiment has exemplified a case in which the trace results L3 are stored in the RAM 13; however, not limited to this, the trace results L3 may be stored in the ROM 12.

The present embodiment has exemplified a case in which a plurality of tasks include one update task (task A) and two reference tasks (tasks B and C); however, not limited to this, as long as one update task exists, a single reference task may be used, or three or more reference tasks may be used.

Moreover, in the present embodiment, the values of the external variable GV1 and the like are exemplary only, and the present invention is not intended to be limited by those values.

Furthermore, in the present embodiment, the task may include a task (event task) that is executed when a preliminary set execution condition is satisfied, in addition to tasks that are regularly executed (fixed-cycle tasks).

INDUSTRIAL APPLICABILITY

The present invention is applicable to a control device for controlling a control object apparatus and a system program executed in the control device.

DESCRIPTION OF SYMBOLS

1 CPU unit (control device)
13 RAM (storage unit)
15 communication IF (communication unit)
21 task execution unit (task execution means)
22 reference data management unit
23 collection unit
24 setting unit
60 control object apparatus
70 tool device
121 system program

The invention claimed is:

1. A control device for controlling a control object apparatus, the control device comprising:
a memory configured to store a plurality of global variables and respective reference data corresponding to the global variables;
a processor configured to execute a plurality of tasks and to manage the reference data, each task including a program;
a receiver; and
a transmitter, wherein
the plurality of the tasks is executed in parallel, with each task of the plurality of tasks being executed in different cycles,
the plurality of tasks being executed in parallel includes at least one update task for updating the global variables, and at least one read-only reference task for referencing the reference data corresponding to the global variables,
the processor is further configured to update a first value of the reference data to correspond to a first value of a global variable prior to executing a reference task and to maintain the first value of the reference data until the reference task is completed, and to update, during execution of the reference task, the first value of the global variable to have a second value, such that the updating of the first value of the global variable and execution of the reference task are performed concurrently,
the processor is further configured to set a collection target, and to collect a value of the collection target when the plurality of tasks is executed,
the receiver is configured to receive, from a tool device, the collection target and
a collection cycle in which the value of the collection target is collected,
the processor is further configured to collect the value of the collection target in the collection cycle when the plurality of tasks is executed, and
the transmitter is configured to transmit collection results to the tool device.

2. The control device according to claim 1, wherein
the processor is further configured to collect the global variables to be updated when the plurality of tasks is executed.

3. The control device according to claim 2, wherein
the plurality of tasks includes a single update task and multiple reference tasks,
the memory stores the reference data corresponding to the global variables for the reference tasks, and
the processor is further configured to collect the reference data when the plurality of tasks is executed.

4. The control device according to claim 1, wherein
the plurality of tasks includes a single update task and multiple reference tasks,
the memory stores the reference data corresponding to the global variables for the reference tasks, and
the processor is further configured to collect the reference data when the plurality of tasks is executed.

5. The control device according to claim 1, wherein
the memory stores the collection results.

6. A non-transitory computer readable medium that store a system program, the system program, when executed by a processor, causes a computer to execute:
executing a plurality of tasks, each task including a program;
storing a plurality of global variables and respective reference data corresponding to the global variables;
managing the reference data stored, wherein the plurality of the tasks includes at least one update task for updating the global variables, and at least one read-only reference task for referencing the reference data corresponding to the global variables, the plurality of the tasks being executed in parallel, with each task of the plurality of tasks being executed in different cycles;
updating a first value of the reference data to correspond to a first value of a global variable prior to executing a reference task and to maintain the first value of the reference data until the reference task is completed;
updating, during execution of the reference task, the first value of the global variable to have a second value, such that the updating of the first value of the global variable and execution of the reference task are performed concurrently;
setting a collection target;
collecting a value of the collection target when the plurality of tasks is executed;
receiving, from a tool device, the collection target and a collection cycle in which the value of the collection target is collected, wherein the value of the collection target is collected in the collection cycle when the plurality of tasks is executed; and
transmitting collection results to the tool device.

* * * * *